(12) United States Patent
Brandt et al.

(10) Patent No.: US 6,671,027 B2
(45) Date of Patent: Dec. 30, 2003

(54) LIQUID CRYSTAL DISPLAY INCLUDING HEATING LAYER AND TWO BUS BARS FORMED BY A CLAMP HAVING TWO LIMBS

(75) Inventors: Peter Brandt, Aschaffenburg (DE);
Ernst-Ulrich Simon, Oberursel (DE);
Hans Kolibius, Babenhausen (DE);
Thomas Ritter, Alzenau (DE);
Manfred Zeiss, Russelsheim (DE)

(73) Assignee: Siemens Aktiengesellschaft, München (DE)

( * ) Notice: Subject to any disclaimer, the term of this patent is extended or adjusted under 35 U.S.C. 154(b) by 229 days.

(21) Appl. No.: 09/960,841

(22) Filed: Sep. 22, 2001

(65) Prior Publication Data
US 2002/0047954 A1 Apr. 25, 2002

(30) Foreign Application Priority Data

| Sep. 25, 2000 | (DE) | 100 47 694 |
| Dec. 22, 2000 | (DE) | 100 64 767 |
| Jun. 7, 2001 | (DE) | 101 27 490 |
| Aug. 22, 2001 | (DE) | 101 40 175 |

(51) Int. Cl.⁷ .................. G02F 1/1333; G02F 1/133
(52) U.S. Cl. .................. 349/161; 349/58; 349/20; 349/21
(58) Field of Search .................. 349/149, 161, 349/58, 20, 21, 56

(56) References Cited

U.S. PATENT DOCUMENTS

| 4,643,525 A | * | 2/1987 | Haim | 349/161 |
| 4,738,625 A |   | 4/1988 | Burton | 439/59 |
| 4,773,735 A |   | 9/1988 | Ukrainsky | 350/331 T |
| 5,886,763 A |   | 3/1999 | Wolkowicz et al. | 349/161 |
| 6,042,689 A | * | 3/2000 | Prester et al. | 156/583.1 |
| 6,317,178 B1 | * | 11/2001 | Brandt et al. | 349/72 |

OTHER PUBLICATIONS

Patent Abstracts of Japan, vol. 017, No. 231, May 11, 1993 & JP 04 360125 A (Toshiba Corp), Dec. 14, 1992.

* cited by examiner

Primary Examiner—Tarifur R. Chowdhury
(74) Attorney, Agent, or Firm—Martin A. Farber

(57) ABSTRACT

A liquid crystal display having a liquid crystal cell (1) has electrical heating formed by an electrically conductive heating layer (3) on a substrate (2). On opposite sides, a clamp (4) forming a busbar in each case reaches over the substrate (2) and bears on the heating layer (3) by a limb (5). For connection to the heating current source, a spring element (7) is arranged between a limb (6) of the clamp (4) and a printed circuit board (8).

13 Claims, 3 Drawing Sheets

LIQUID CRYSTAL DISPLAY INCLUDING HEATING LAYER AND TWO BUS BARS FORMED BY A CLAMP HAVING TWO LIMBS

FIELD AND BACKGROUND OF THE INVENTION

The invention relates to a liquid crystal display, in particular for a motor vehicle, having a liquid crystal cell having electrical heating formed by an electrically conductive heating layer on a substrate and two busbars which, on opposite sides of the substrate, lead over the width of the heating layer and are in each case provided with a contact connection for connection to a heating current source.

Liquid crystal displays of the above type are currently known and conventional. The electrical heating makes it possible to achieve short switching times even at low temperatures, with the result that, by way of example, DSTN cells are also suitable for use in the motor vehicle. The two busbars, usually called zero-ohm rails, have the task of ensuring a uniform current flow over the entire width of the electrically conductive heating layer, thereby producing uniform heating of the heating layer and thus of the liquid crystal cell over its entire area.

An attempt has already been made to realize the contact connection of the heating layer by busbars which are to be applied on opposite sides of the heating layer and to which, in turn, an electrical conductor is to be soldered, but this causes considerable costs and does not ensure permanent contact connections.

SUMMARY OF THE INVENTION

The invention is based on the problem of designing a liquid crystal display of the type mentioned in the introduction in such a way that the means for contact connection of its heating layer are designed as simply as possible and ensure reliable contact connection.

This problem is solved according to the invention by virtue of the fact that the busbars are in each case formed by a clamp having two limbs, one limb of which clamp reaches over the substrate onto the heating layer and the other limb of which clamp reaches under the substrate, and in that, for connection to the heating current source, a spring element is arranged between one limb of the clamp and a printed circuit board.

Such a clamp can be pushed with little assembly effort onto the substrate, where it forms the busbars for uniform distribution of the electric current. Therefore, it is possible to dispense with separate busbars in the form of conductor tracks applied to the heating layer. The clamp according to the invention may preferably be composed of the same material as the spring element bearing against it, with the result that the transition of the electrical energy from the spring element into the clamp does not pose any difficulties. The substrate may be a separate support or a substrate of the liquid crystal cell.

Particularly uniform current distribution in the layer forming the heating can be achieved if the clamp leads over the entire width of the heating layer.

The clamp can be pushed particularly easily over the edge of the substrate, but is supported with a sufficiently high prestress force on the heating layer, if the limb of the clamp which bears on the heating layer has a profile curved approximately in an S-shaped manner, as seen from the side.

The liquid crystal cell together with the mounted clamp can easily be pushed into a light box of a liquid crystal display without the risk of getting stuck or getting caught if, in accordance with another development of the invention, the lower limb of the clamp is designed as a flat web oriented parallel to the substrate.

Uniformly high press-on forces of the clamp over its entire width onto the heating layer can be achieved by the upper limb of the clamp being formed by a multiplicity of spring tongues running next to one another.

If the liquid crystal display is exposed to particularly strong vibrations and shaking during later operation, another development of the invention can provide for the clamp to be additionally fixed on the substrate by an adhesive.

Production tolerances can be compensated to a particularly great extent if the spring element is a helical spring, because the latter can deform on all sides in order to bridge alignment errors. In addition, the helical spring constitutes a space-saving and cost-effective contact connection. Moreover, construction tolerances can be compensated in a simple manner with such an embodiment.

In order to reduce the diversity of parts, it is also possible, however, for the spring element to be formed by at least one spring limb which is integrally formed on the clamp and whose free end bears with prestress on the printed circuit board.

In order to obtain the simplest possible connection to the heating current source, it is proposed that the spring element is formed by at least one spring lug which is integrally formed on the clamp and on whose other end a plug pin is integrally formed, which is plugged into a plug socket on a printed circuit board.

In order that the electrical resistance is as small as possible, it is proposed that a plurality of spring lugs arranged next to one another merge with a connecting web, on which the plug pin is integrally formed. At the same time, press-in lugs oriented perpendicularly to the plug pin can be provided on said connecting web. Said press-in lugs can make it possible to build up a sufficiently large pressure on the plug pin in order to insert it into the plug socket.

In this arrangement, it is expedient that each spring lug forms an arc whose vertex is remote from the clamp. This form can easily be achieved through a single bending operation. It suffices to reliably compensate the tolerances to be bridged.

The contact connection of the clamp to the heating layer is on the one hand intended to have the smallest possible contact resistance. On the other hand, however, the plug-on force is not intended to be to large because this could possibly destroy the heating layer. Therefore, it is proposed that that limb of the clamp which bears on the heating layer, as viewed from the side, runs into a double arc with two bearing points, and that the lower limb, as viewed from the side, runs in a single arc with one contact point, the contact point of the lower limb lying between the bearing points of the upper limb.

On account of different thermal expansion of the clamp and of the substrate to which the clamp is connected, a relative movement between clamp and substrate can occur in the event of large temperature fluctuations. In order to prevent this, it is advantageous to divide the clamp into a plurality of segments in the longitudinal direction and/or to separate individual spring tongues of the clamp to the greatest possible extent (i.e. that adjacent spring tongues are separated from one another over at least ⅔ of their length). When the clamp is separated into a plurality of segments, a spring element for connection to the heating current source is provided on each segment.

BRIEF DESCRIPTION OF THE DRAWINGS

The invention permits various embodiments. In order to further illustrate this basic principle, three of these embodiments are represented in the drawing and are described below. In the figures.

DETAILED DESCRIPTION OF THE PREFERRED EMBODIMENTS

Figure 1:
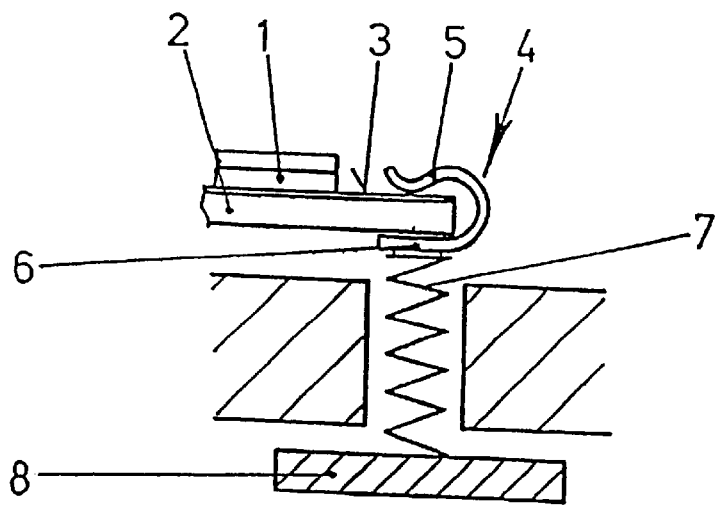
FIG. 1 shows a diagrammatic section through a partial region of a liquid crystal display according to the invention

FIG. 1 shows a liquid crystal cell 1 bearing on a substrate 2 forming heating. The substrate 2, which is normally a glass plate, has a heating layer 3 on its top side, which heating layer may be formed by an ITO layer. It is also conceivable for the substrate 2 to be formed by the bottommost plate of the liquid crystal cell 1 (or a further liquid crystal cell), by the heating layer 3 being applied directly on said plate and, for example, the plate projecting beyond the liquid crystal cell 1 on two sides, with the result that the contact connection is possible there.

For contact connection of the heating layer 3, use is made of a clamp 4 reaching over the substrate 2, which clamp, with a limb 5 curved in an s-shaped manner, reaches over the substrate 2 and makes contact with the heating layer 3 and has a planar limb 6 which bears against the substrate 2 from underneath. A spring element 7 is supported against this planar limb 6, which spring element is designed as a helical spring in the exemplary embodiment shown and bears against a printed circuit board 8 with its other end.

Figure 2:
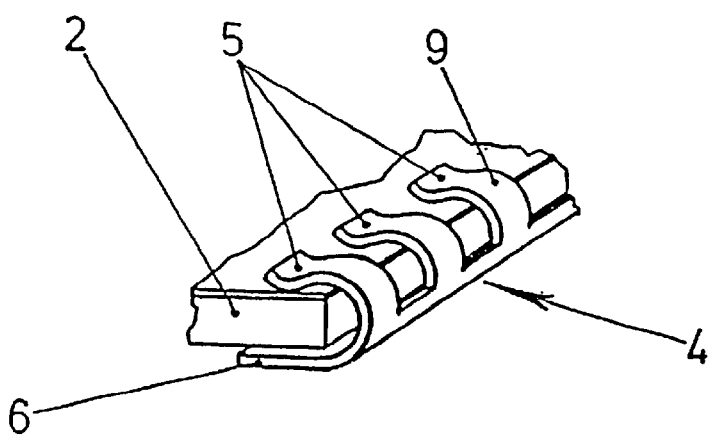
FIG. 2 shows a perspective view of a region of FIG. 1.

FIG. 2 reveals that the limb 5 of the clamp 4 is formed by a multiplicity of individual spring tongues 9.

Figure 3:
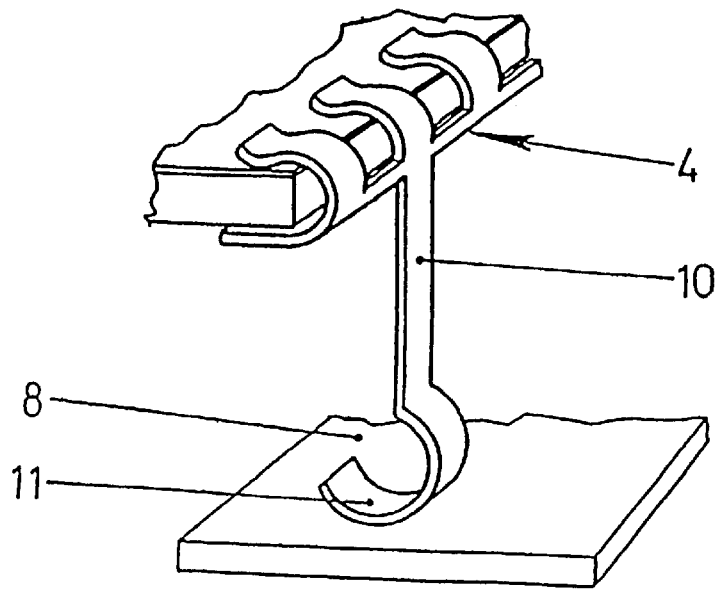
FIG. 3 shows a perspective view of a second embodiment of a partial region of a liquid crystal display.

In the embodiment according to FIG. 3, a separate spring element 7 (FIG. 1) has been dispensed with by a spring limb 10 being integrally formed on the clamp 4. This spring limb 10 leads away from the clamp 4 to the printed circuit board 8, on which it is supported by an arcuately curved supporting region 11.

Figure 4:
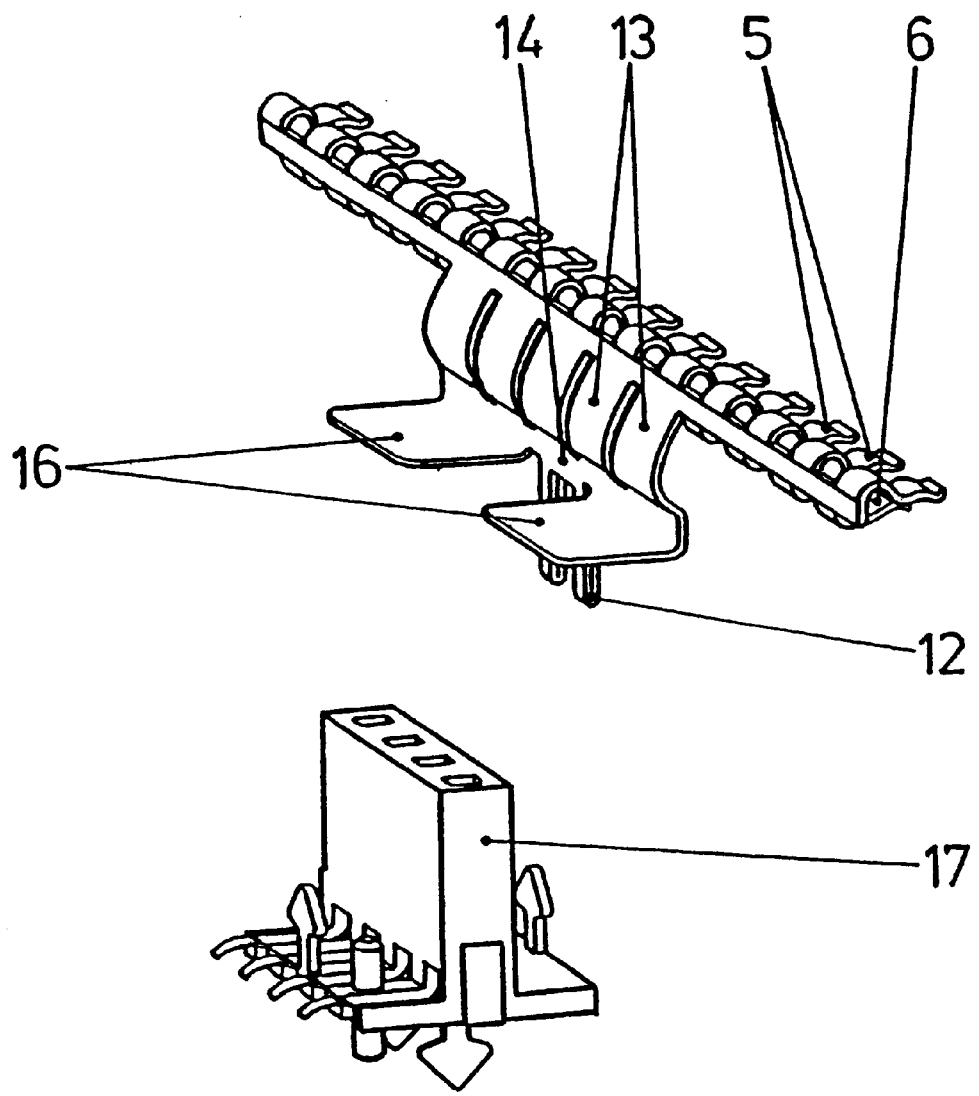
FIG. 4 shows a perspective view of a third embodiment of a clamp with an integrally formed plug.
Figure 5:
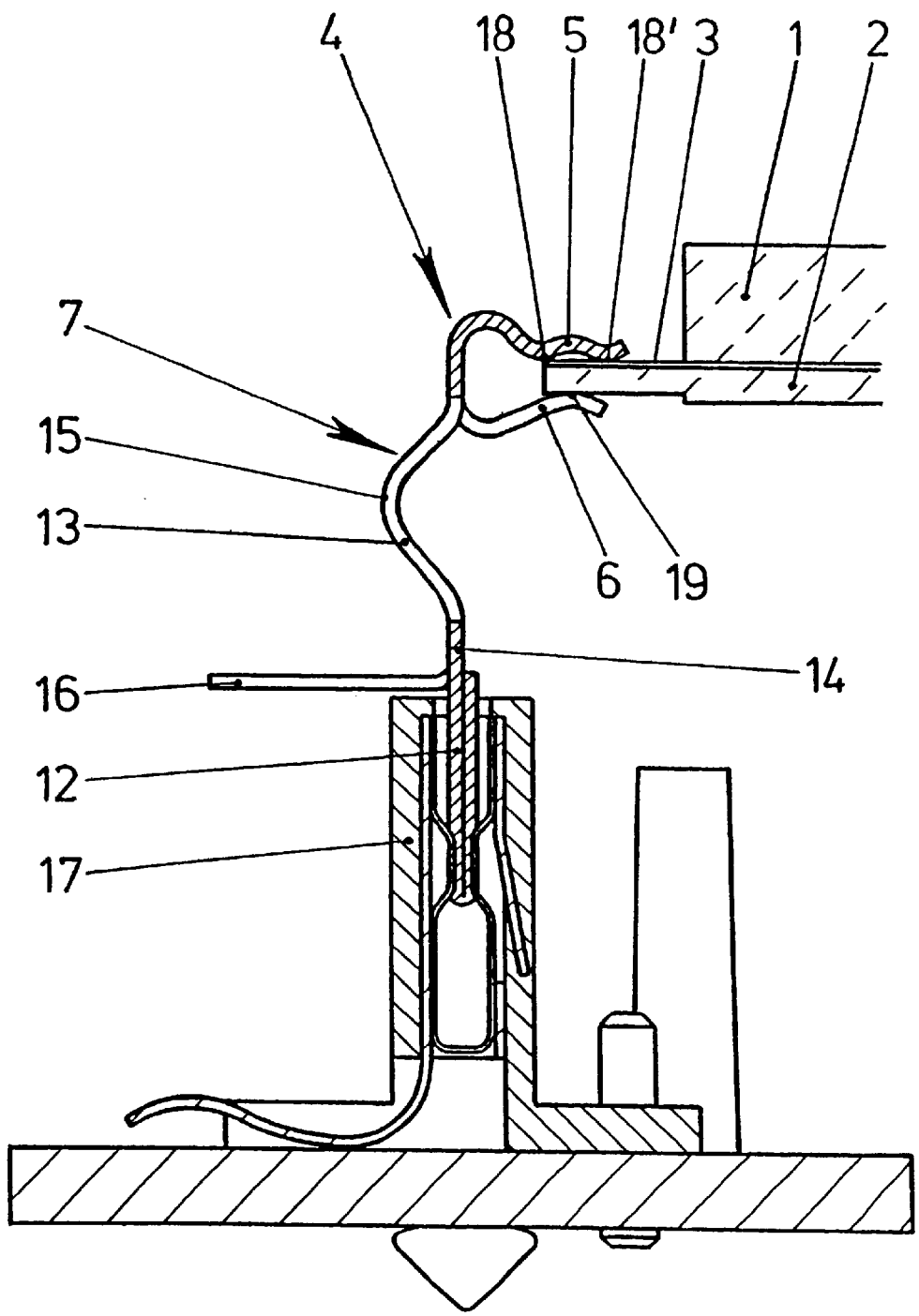
FIG. 5 shows a section through the representation of FIG. 4.

In the embodiment according to FIGS. 4 and 5, a separate spring element 7 (FIG. 1) has likewise been dispensed with. Rather, the clamp 4 is designed in one piece with the spring element and a plug 12 provided with two contact lugs. The spring element comprises a plurality of spring lugs 13 which are arranged next to one another, whose upper ends adjoin the busbar of the clamp 4 and whose lower ends adjoin a connecting web 14. Each spring lug 13 runs from top to bottom in an arc whose vertex 15 is remote from the clamp 4. For compensation of tolerances, the arc is either extended or compressed.

Two press-in lugs 16 protrude from the connecting web 14 perpendicularly to the plug pin 12. They are intended to facilitate the insertion of the plug pin 12 into a socket 17 on the printed circuit board. To ensure that the plug pin 12 latches reliably in the socket 17, a pressure is exerted on the pressed-in lugs 16 from above.

In this exemplary embodiment, the clamp 4 has a multiplicity of pairs formed from an upper and a lower limb 5, 6, the upper limb 5 in each case running in a double arc and making electrical and mechanical contact with the heating layer 3 in two bearing lines 18, 18', while the corresponding lower limb 6 is embodied as a single arc which makes mechanical contact with the substrate 2-carrying the heating layer 3-from below once in a line of contact 19. In this case, the line of contact 19 of a lower limb 6 in each case lies between the bearing lines 18, 18' of the associated upper limb 5.

We claim:

1. A liquid crystal display, in particular for a motor vehicle, having a liquid crystal cell having electrical heating formed by an electrically conductive heating layer on a substrate and two busbars which, on opposite sides of the substrate, lead over the width of the heating layer and are in each case provided with a contact connection for connection to a heating current source, wherein the busbars are in each case formed by a clamp (4) having two limbs (5, 6), one limb (5) of said clamp reaches over the substrate (2) onto the heating layer (3), and the other limb (6) of said clamp reaches under the substrate (2), and for connection to the heating current source, a spring element (7) is arranged between one limb (6) of the clamp (4) and a printed circuit board (8).

2. The liquid crystal display as claimed in claim 1, wherein the clamp (4) leads over the entire width of the heating layer (3).

3. The liquid crystal display as claimed in claims 2, wherein the upper one limb (5) of the clamp (4) which bears on the heating layer (3) has a profile curved approximately in an S-shaped manner, as seen from the side.

4. The liquid crystal display as claimed in claim 3, wherein the lower other limb (6) of the clamp (4) is formed as a flat web oriented parallel to the substrate (2).

5. The liquid crystal display as claimed in claim 1, wherein the upper one limb (5) of the clamp (4) is formed by a multiplicity of spring tongues (9) running next to one another.

6. The liquid crystal display as claimed in claim 1, wherein the clamp (4) is additionally fixed on the substrate (2) by an adhesive.

7. The liquid crystal display as claimed in claim 1, wherein the spring element (7) is a helical spring.

8. The liquid crystal display as claimed in claim 1, wherein the spring element (7) is formed by at least one spring limb (10) which is integrally formed on the clamp (4) and a free end of the spring leg bears with prestress on the printed circuit board (8).

9. The liquid crystal display as claimed in claim 1, wherein the spring element (7) is formed by at least one spring lug (11) which is integrally formed on the clamp 4) and on an end of the spring lug a plug pin (12) is integrally formed.

10. The liquid crystal display as claimed in claim 1, wherein a plurality of spring lugs (13) arranged next to one another merge with a connecting web (14), and a plug pin (12) and press-in lugs (16) oriented perpendicularly to the plug pin (12) are integrally formed on the connecting web.

11. The liquid crystal display as claimed in claim 10, wherein each spring lug (13) forms an arc having a vertex (15) remote from the clamp (4).

12. The liquid crystal display as claimed in claim 1, wherein the upper one limb (5) of the clamp (4) which bears on the heating layer (3) has an arcuate profile, as viewed from the side, and has two bearing points or bearing lines (18, 18') on the heating layer (3), and the lower other limb (6), as viewed from the side, runs in a single arc with one point of contact or a line of contact (19) on the heating layer (3), said one point or line lying between the two bearing points or bearing lines (18, 18') of the upper limb (5) as viewed from the side.

13. The liquid crystal display as claimed in claim 1, wherein the clamp is divided into a plurality of segments in longitudinal direction, and/or adjacent spring tongues of the clamp are separated from one another over at least ⅔ of their length.

* * * * *